United States Patent [19]
Wang

[11] Patent Number: 5,870,165
[45] Date of Patent: *Feb. 9, 1999

[54] EYEGLASSES ADJUSTABLE IN WEARING ANGLE

[76] Inventor: Lee Tzu-Feng Wang, P.O. Box 90, Tainan City, Taiwan

[*] Notice: The term of this patent shall not extend beyond the expiration date of Pat. No. 5,661,535.

[21] Appl. No.: 936,769

[22] Filed: Sep. 24, 1997

Related U.S. Application Data

[63] Continuation-in-part of Ser. No. 698,239, Aug. 15, 1996, Pat. No. 5,661,535.

[51] Int. Cl.$^6$ ........................................................ G02C 1/02
[52] U.S. Cl. ........................... 351/120; 351/110; 351/111
[58] Field of Search ..................... 351/120, 110, 351/111, 118, 119, 125, 140, 41, 105; 2/448, 426

[56] References Cited

U.S. PATENT DOCUMENTS 5,357,292  10/1994  Wiedner ................................. 351/105
5,661,535  8/1997  Wang ..................................... 351/120

*Primary Examiner*—Hung Xuan Dang

[57] ABSTRACT

A pair of eyeglasses adjustable in wearing angle includes a lens body with two side walls extending rear-ward, two connecters fixed movably with the two side sides walls of the lens body, and two temples fixed with the two connecters in such a way that angles of the temples relative to the lens body can be adjusted so as to enable this eyeglasses worn comfortably by persons having differently sized faces.

1 Claim, 4 Drawing Sheets

EYEGLASSES ADJUSTABLE IN WEARING ANGLE

This invention is a continuation-in-part of Ser. No. 698,239, filed Aug. 15, 1996, now U.S. Pat. No. 5,661,535 issued on Aug. 26, 1997 and relates to a pair of eyeglasses adjustable in wearing angle, particularly improving the disclosure of the U.S. Pat. No. 5,661,535.

BACKGROUND OF THE INVENTION

The eyeglasses adjustable in wearing angle disclosed in the above patent includes a lens body, two connecters, and two temples.

The lens body has an upper side extending rearward from an upper end, and two side walls respectively having a continual position holes and a notch in a rear end.

The two connecters are made of plastics, respectively having two vertical walls, a center aperture defined by the two walls, a small pin extending sidewise from one of the two walls, a projection between the two walls extending forward from a rear side of the two walls, and an ear with a hole extending rearward from the rear side of the two walls. The small pin fits in one of the continual holes and the projection fits in the notch of the two walls.

The two temples have respectively a front connecting means provided with a center groove opening to the inner side and a screw hole. The center groove fits with the ear of the connecters, when the temples are combined with the connecters.

The two temples are adjusted in its angle relative to the lens body by a wearer, by means of changeable engagement of the small pins with one of the continual holes and constant engagement of the projections with the notches functioning as fulcrums. Then the front ends of the connecters are able to be adjusted to move up and down to let the temples adjusted in their angles to the lens body. Or the lens body can be moved for changing the angles of the two temples relative to the lens body, suiting to wearers having different sized faces.

SUMMARY OF THE INVENTION

This invention has been devised to offer another kind of eyeglasses adjustable in wearing angle.

A main feature of the invention is two connecters respectively having a projecting bar extending sidewise inward on an inner side of an upper end, an engage means provided under the bar, a stop means fixed on an outer end of the bar, a projection provided on inner side near a lower end to engage a notch on a rear edge of each side wall of a lens body.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
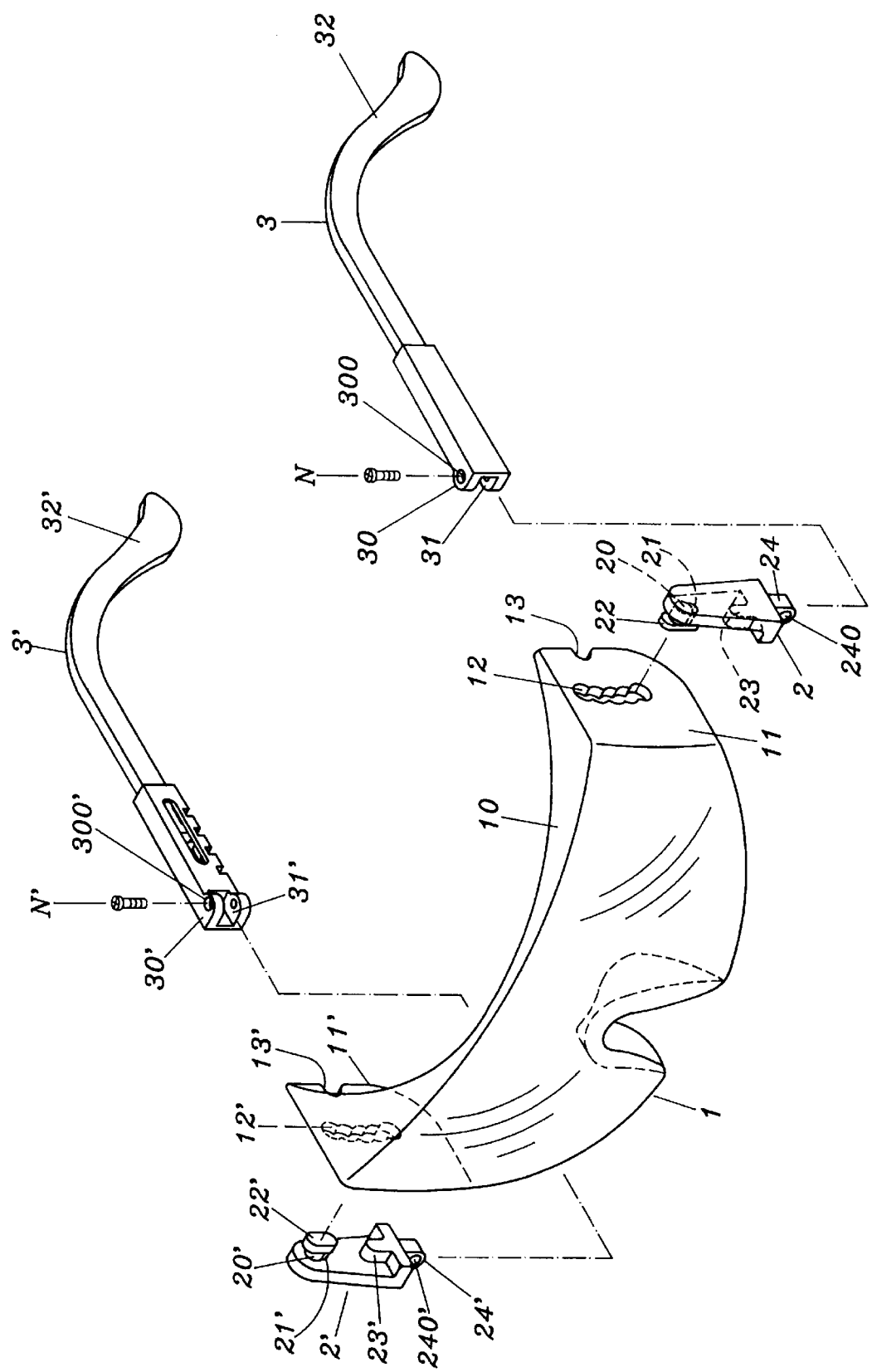
FIG. 1 is an exploded perspective view of eyeglasses adjustable in wearing angle in the present invention.

A preferred embodiment of a pair of eyeglasses adjustable in wearing angle in the present invention, as a continuation of a U.S. Pat. No. 5,661,535, includes a lens body 1, two connecters 2, 2' and two temples 3, 3' combined together.

An upper protective wall 10 is formed to extend rearward from an upper end of the lens body 1, a side protective wall 11, 11' respectively formed to extend rearward right-angled from two side ends of the lens body 1, continual position holes 12, 12' respectively bored vertically in each side protective wall 11, 11', and a notch 13, 13' respectively formed in a rear vertical edge of each side protective wall 11, 11'.

The two connecters 2, 2' are made of plastics, respectively connected with each side protective wall 11, 11', having a sidewise projecting bar 20, 20' extending inward from an upper end, an engage means 21, 21' respectively formed under each bar 20, 20', an oval stop means 22, 22' fixed on an outer end of each bar 20, 20', a projection 23, 23' respectively formed near an inner side near a lower end of the connecter 2, 2' to engage the notch 13, 13' of each protective wall 11, 11', and a projecting ear 24, 24' with a hole 240, 240' formed under a lower end of the connecter 2, 2'.

The two temples 3, 3' are pivotally combined with the two connecters 2, 2', respectively having a fix means 30, 30' formed in a front end and bored with a hole 300, 300', a notch 31, 31' formed in the fix means 30, 30' and engaging with the projecting ear 25, 25' of the connecter 2, 2', and a slowly curved rear end 32 for resting on an ear.

Figure 2:
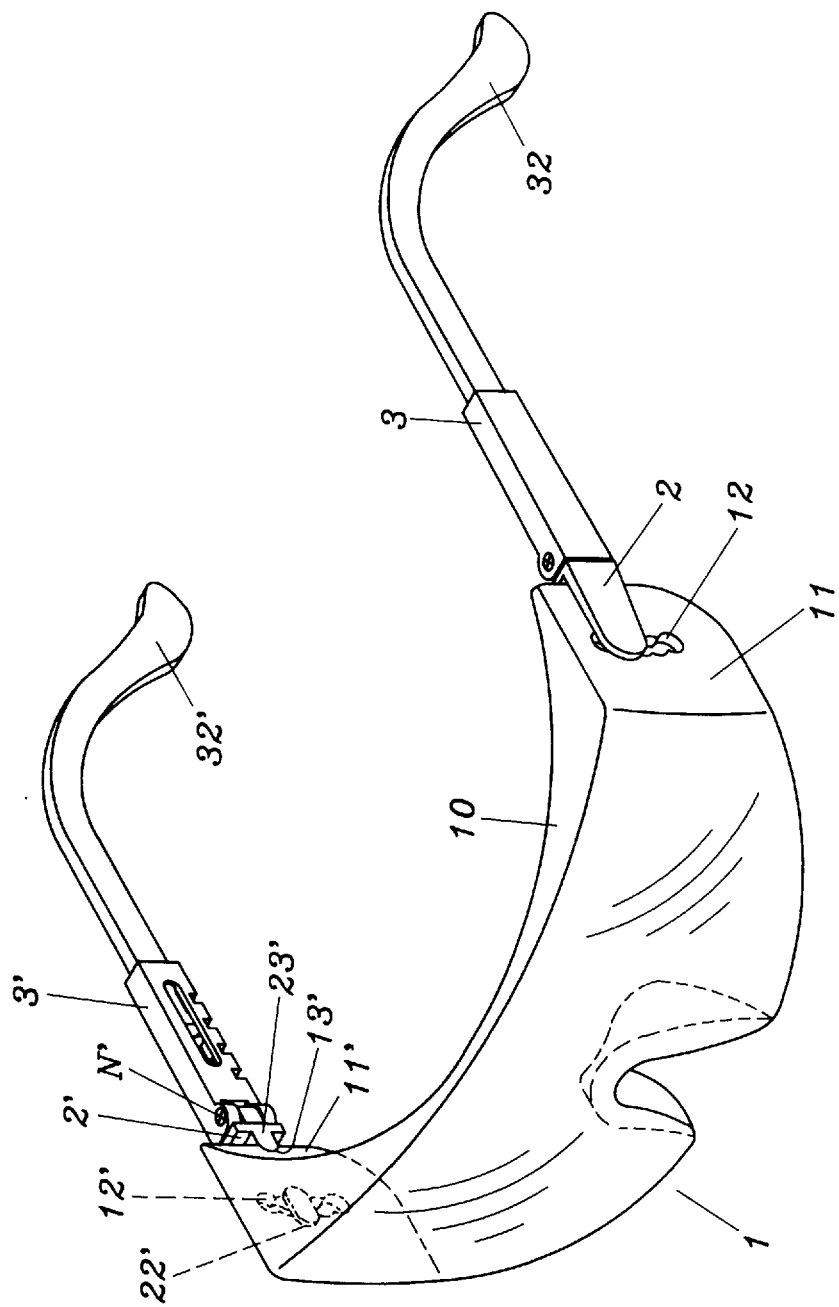
FIG. 2 is a perspective view of the eyeglasses adjustable in wearing angle in the present invention.
Figure 3:
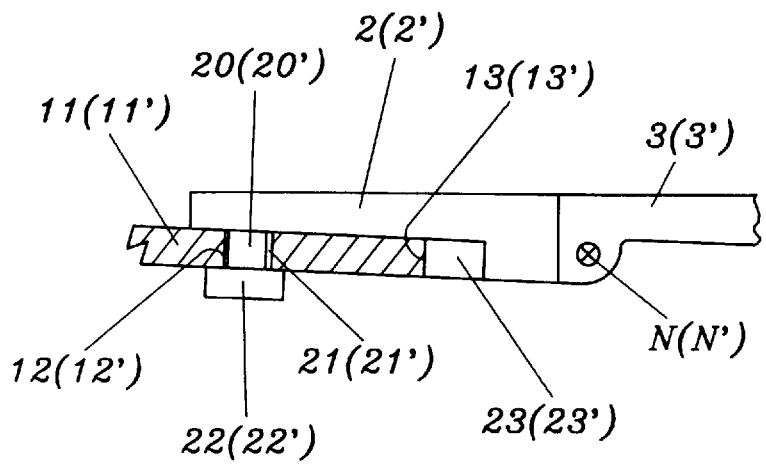
FIG. 3 is a side view of a connecter combined with a lens body in the eyeglasses adjustable in wearing angle in the present invention.
Figure 4:
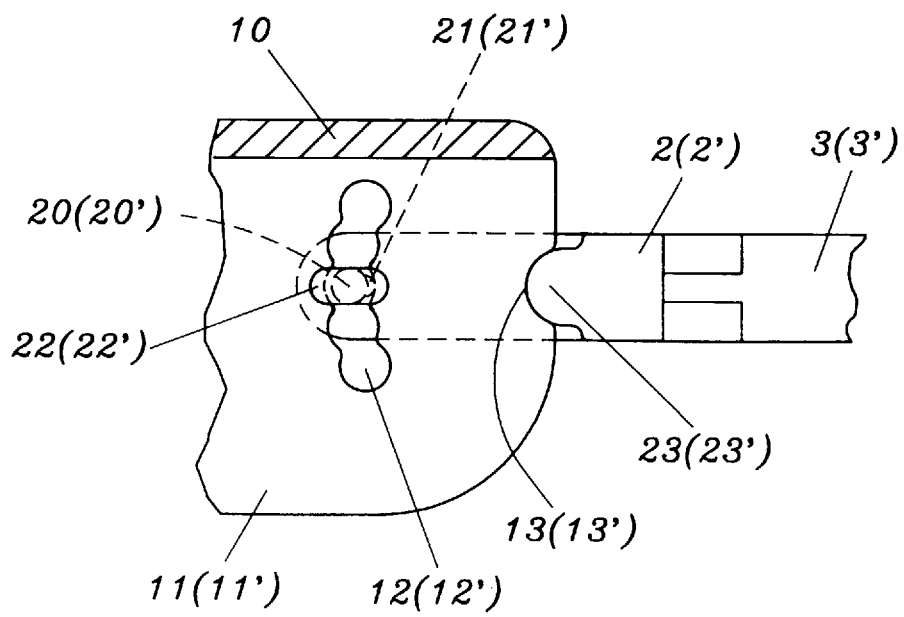
FIG. 4 is a partial enlarged front view of the connecter combined with the lens body in the eyeglasses adjustable in wearing angle in the present invention; and, FIG. 5 is a front view of a temple combined with the lens body in the present invention, showing the angle of the temple relative to the lens body adjusted to slope up and down.

In combining, referring to FIGS. 1 and 2, the stop means 22, 22' of the connecters 2, 2' are respectively pressed through the continual position holes 12, 12' of the lens body 1. Then the connecters 2, 2' is swung with its lower end moving upward until the stop means 23, 23' fit in the notches 13, 13' of the side walls 11, 11', as shown in FIGS. 3, 4, with the stop means 22, 22' contacting and stopped by the inner surface of the side wall 11, 11', with the bar 20, 20' fitting in one of a position of the continual position holes 12, 12', finishing combination of the connecters 2, 2' with the two protective side walls 11, 11'. After that, the fix means 30, 30' of the two temples are respectively fitted in the projecting ears 25, 25' of the connecters 2, 2', with the holes 300, 300' of the fix means 30, 30' aligned to the holes 250, 250' of the ears 25, 25' and screws N, N' screwing therein, finishing combination of the temples 3, 3' with the connecters 2, 2'.

Figure 5:
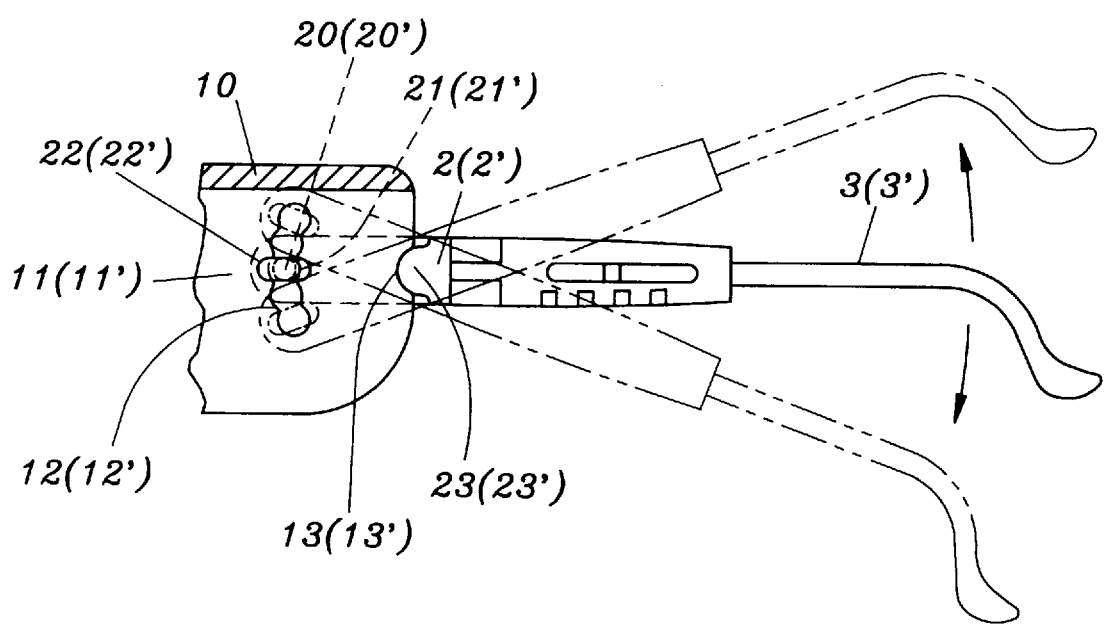

In using, referring to FIG. 5, the fitting position of the projecting bars 20, 20' and the engage means 21, 21' in the continual position holes 12, 12' of the projecting side walls 11, 11' may be adjusted, with the engaging point of the stop means 23, 23' fitting with the notches 13, 13' as a fulcrum. Besides, the engage means 21, 21' surely fit in a position in the continual position holes 12, 12', permitting the connecters 2, 2' adjusted to move up and down and the temples 3, 3' also swinging up and down together with the connecters 2, 2' to change its angle relative to the lens body 1. Instead of moving the temples 3, 3, the lens body 1 can be moved to adjust the angle of the temples 3, 3' relative to the lens body 1 in the same principle. Thus the angle of the temples relative to the lens body is adjusted to suit to different sized faces of users, who then feel comfortable in wearing this pair of eyeglasses.

What is claimed is:

1. A pair of eyeglasses adjustable in wearing angle comprising;

a lens body having two, right and left, side walls extending rearward, said side walls respectively having continual position holes and a notch in a rear side;

two connecters respectively fixed movably with said two side walls of said lens body and having a projecting ear in a rear end;

two temples respectively fixed pivotally with said two connecters, respectively having a slowly curved end for resting on an ear;

and characterized by said two connecters respectively having a projecting bar extending sidewise from an inner side of a front end, an engage means formed under said bar, a stop means fixed on an outer end of said bar, a projection formed to extend up from an inner side of a rear end and engaging with said notch of each said side wall of said lens body; said bars and said engage means adjusted in a position in said continual position holes of said two side walls with the engaging point of said projections of said connecters with said notches of said two side walls functioning as a fulcrum, said two connecters then adjusted to move up and down so that the angle of said temples relative to said lens body may be changed so as to enable said eyeglasses worn comfortably by persons having differently sized faces.

* * * * *